United States Patent Office 3,266,919
Patented August 16, 1966

3,266,919
CYANOETHYL CARBOHYDRATE CAPROLACTAM MIXTURE
William W. Cooner, Wenonah, N.J., assignor to E. I. du Pont de Nemours and Company, Wilmington, Del., a corporation of Delaware
No Drawing. Filed Nov. 23, 1962, Ser. No. 239,796
5 Claims. (Cl. 106—178)

The present invention relates to new compositions of plasticized cyanoethylated hydroxylic polymer ethers having improved properties over the unplasticized polymers.

Within recent years, cyanoethyl ethers of hydroxylic polymers have been used for a number of varied purposes. For example, they have been found to have good electrical properties for use in the manufacture of condensers, as binders for the phosphors in electroluminescent panels, and the like. Particularly useful in such applications are the cyanoethyl ethers of cellulose (CyEC) and starch (CyES). Cyanoethyl cellulose having a degree of substitution above 2.2 and soluble in organic solvents has been found to be a good binder for the phosphors in electroluminescent panels because of its high dielectric constant and its low dissipation factor.

The films or sheets of cyanoethylcellulose or starch containing phosphors are somewhat fragile and good plasticizers are needed for such films. Because the brightness of an electroluminescent device is greater the higher the dielectric constant, plasticizers which improve both film physical properties and dielectric constant are particularly desirable.

Lower substituted cyanoethyl cellulose, having a degree of substitution of about 0.4 to 0.8, is soluble in water and is used for making water-soluble films. Water-soluble films are of considerable interest for individual packaging of such products as household detergents, wherein the entire package can be tossed into a washing machine without emptying the contents. Water-soluble cyanoethyl cellulose is especially good for this use because, in addition to packaging the detergent, it also aids in preventing the redeposition of soil onto the clothes during the washing operation. One of the requirements for such detergent packages is that the film must be flexible and strong. In order to obtain such a film, a plasticizer is needed for the water-soluble cyanoethyl cellulose.

The present invention provides plasticized compositions comprising mixtures of cyanoethyl ethers of hydroxylic polymers and N-(2-cyanoethyl)caprolactam. In general, the N-(2-cyanoethyl)caprolactam will comprise from 3 to 50% based on the total weight of polymer and plasticizer.

The cyanoethyl ethers of hydroxylic polymers suitable for plasticization by the process of the present invention are cyanoethyl cellulose, cyanoethyl starch and its constituents cyanoethyl amylose and cyanoethyl amylopectin, cyanoethyl polyvinyl ether, cyanoethyl alginic acid, and cyanoethyl ethers of such gums as guar, gum arabic, tragacanth and many others as well as mixtures thereof. Cyanoethylated polysaccharides, especially cyanoethyl cellulose and starch, having a degree of substitution of at least about 0.3, are preferred.

N-(2-cyanoethyl)caprolactam is made by reacting acrylonitrile with caprolactam in the presence of a basic catalyst. A process for making this material is disclosed in the Journal of the American Chemical Society, volume 70, page 2115.

The N-(2-cyanoethyl)caprolactam is mixed with the polymer to be plasticized in any suitable manner. This mixing can be accomplished by a sigma-blade mixer, a roll mill, a ball mill, or by any suitable means which provides intimate contact of the plasticizer with the material to be plasticized. As previously indicated, the quantity of N-(2-cyanoethyl)caprolactam used as a plasticizer will normally range from about 3% up to about 50% of the total weight of the polymer and plasticizer. More plasticizer than this, for example, up to 75% or even higher can be used, but the tensile strength and other properties tend to be lower because of dilution of the polymeric material. Less than 3% N-(2-cyanoethyl)caprolactam does not impart adequate flexibility and strength. When water-soluble polymers are being plasticized, the N-(2-cyanoethyl)caprolactam, which itself is water-soluble, can be added to aqueous solutions of the polymers. Films of plasticized polymer can then be cast directly from solutions containing the polymer and plasticizer. Similarly, plasticized sheets and films of organic solvent-soluble polymers can be cast from solutions of polymer and N-(2-cyanoethyl)caprolactam in a mutual organic solvent therefor, for example, a mixture of dimethylformamide and acetone.

When either water-soluble or organic solvent-soluble polymers are to be plasticized with N-(2-cyanoethyl)caprolactam, plasticized objects can be then prepared from the mix described above by heating the mixture of plasticizer and polymer under pressure in an appropriate mold using conventional techniques. Both films and more massive objects can be formed in this manner.

In addition to the cyanoethylated polymer and N-(2-cyanoethyl)caprolactam the plasticized compositions can contain other ingredients such as pigments, fillers, other plasticizers, blowing agents and phosphors. The quantities of these additives added will depend on the results required. The quantity of pigment, for example, will depend on the color desired. Pigments normally comprise from about 0.1% to about 50% of the total composition. Fillers are generally added to cheapen the compositions and the greatest quantity which can be used without the sacrifice of necessary physical properties will be used when cost is an important factor. Normally, up to 50% of the total composition can be filler.

The quantity of blowing agent used will depend on the expansion desired. Normally, from about 1% to about 40% or more of the total composition can be blowing agent.

Phosphors can be added to make luminescent compositions. The quantity of phosphor added is generally limited by the cost of the phosphor and will not, in general, be more than 10% of the total composition.

Other plasticizers can be added to the compositions if desired in amounts from about 1 to about 40% of the total composition where they do not interfere with the properties desired. Dimethyl sulfoxide or dimethylacetamide, for example, can serve as such plasticizers.

The invention is more thoroughly illustrated with the aid of the following examples. Parts and percentages where given are by weight.

*Example 1*

Films of water-soluble CyEC (degree of substitution— 0.7) are prepared by casting 4% aqueous solutions of the CyEC with and without N-(2-cyanoethyl)caprolactam (CyECL) on a glass plate, drying at room temperature and peeling off the resulting films. The properties of the films are as follows:

| Composition of film | CyEC | CyEC + 18% added CyECL | CyEC + 54% added CyECL |
|---|---|---|---|
| Cold drop (fraction passing) | ½ | ⅔ | all |
| Tensile elongation (percent) | 3 | (¹) | 10 |
| MIT flex (cycles) | 1,100 | (¹) | 2,250 |
| Film thickness (mils) | 1.5 | 1.2 | 1.5 |

¹ Not determined.

The cold drop is determined by preparing packages containing 25 grams of detergent from the water-soluble films, chilling them at −5° F. for 4 days, removing the packages and immediately dropping them 4 feet onto a hard surface. The results are reported as the fraction of packages dropped which did not break.

The tensile properties are measured by ASTM D882–54T and the MIT flex by ASTM 643–43 Method B.

*Example 2*

Unsupported films of CyEC and CyES (degree of substitution—2.7) are prepared in the following manner:

CyEC (or CyES) is mixed with the designated amount of N-(2-cyanoethyl)caprolactam with a mortar and pestle. The resulting mixture is molded for 2 to 3 minutes between 6 x 6 x ½ inch chrome steel plates heated with 25 p.s.i.g. steam with 7.5 mil "Mylar" as a backer at 8 tons load for the CyES sample. The CyEC sample is heated with 140 p.s.i.g. steam and molded at 30 tons load.

The dielectric properties of the films are given below:

| Material: | Dielectric constant at 23° C., 50% relative humidity, and 100 cycles/second |
|---|---|
| CyEC | 17.9 |
| CyEC+10% added CyECL | 22.6 |
| CyEC+20% added CyECL | *25.5 |
| CyES | 18.9 |
| CyES+10% added CyECL | 25.9 |

*At 1000 cycles/sec.

The invention has been illustrated by the foregoing. Many additional modifications will be obvious to those skilled in the art without departing from the inventive concept.

I claim:
1. A composition comprising a mixture of a cyanoethyl ether of a hydroxylic polymer and N-(2-cyanoethyl)caprolactam.
2. The composition of claim 1 wherein the composition contains about from 3 to 50% by weight of N-(2-cyanoethyl)caprolactam based on the total weight of polymer and N-(2-cyanoethyl)caprolactam.
3. The composition of claim 2 wherein the cyanoethyl ether of the hydroxylic polymer is selected from the group consisting of cyanoethylcellulose and cyanoethyl starch.
4. Cyanoethylcellulose admixed with N-(2-cyanoethyl) caprolactam.
5. Cyanoethylstarch admixed with N-(2-cyanoethyl) caprolactam.

References Cited by the Examiner
UNITED STATES PATENTS

| 2,724,632 | 11/1955 | Weisberg | 106—203 |
| 2,837,438 | 6/1958 | Sample | 106—213 |
| 2,842,541 | 7/1958 | Journeay | 106—210 |

FOREIGN PATENTS

766736/23–4  2/1962  U.S.S.R.

ALEXANDER H. BRODMERKEL, *Primary Examiner.*

J. H. WOO, *Assistant Examiner.*